United States Patent
Xu

(10) Patent No.: US 11,108,594 B2
(45) Date of Patent: Aug. 31, 2021

(54) IMPLEMENTING THREE-LAYER COMMUNICATION

(71) Applicant: New H3C Technologies Co., Ltd., Hangzhou (CN)

(72) Inventor: Zhihui Xu, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 34 days.

(21) Appl. No.: 16/618,091

(22) PCT Filed: May 28, 2018

(86) PCT No.: PCT/CN2018/088622
§ 371 (c)(1),
(2) Date: Nov. 27, 2019

(87) PCT Pub. No.: WO2018/219247
PCT Pub. Date: Dec. 6, 2018

(65) Prior Publication Data
US 2020/0153659 A1    May 14, 2020

(30) Foreign Application Priority Data
May 31, 2017 (CN) .......................... 201710397622.6

(51) Int. Cl.
*H04L 29/02* (2006.01)
*H04L 12/46* (2006.01)
(Continued)

(52) U.S. Cl.
CPC .......... *H04L 12/4641* (2013.01); *H04L 45/74* (2013.01); *H04L 49/45* (2013.01);
(Continued)

(58) Field of Classification Search
CPC ............... H04L 61/103; H04L 61/2007; H04L 29/12216; H04L 61/6022; H04L 29/12839; H04L 12/4641; H04L 49/45
See application file for complete search history.

(56) References Cited

U.S. PATENT DOCUMENTS 7,088,737 B1    8/2006 Carrel
2003/0131133 A1    7/2003 Nyu et al.
(Continued)

FOREIGN PATENT DOCUMENTS

CN    1516408 A    7/2004
CN    101005437 A    7/2007
(Continued)

OTHER PUBLICATIONS

Wang, machine translation of CN105827496A, 2016, retrieved from Espacenet, 12 pages. (Year: 2016).*
(Continued)

*Primary Examiner* — Hoon J Chung
(74) *Attorney, Agent, or Firm* — McCoy Russell LLP

(57) ABSTRACT

In an example of a method for implementing three-layer communication of a management packet, a controlling bridge creates a first virtual management ethernet (VME) port with a first MAMA address, and allocates a first IP address to the first VME port. A port extender creates a second VME port with a second MAC address, and requests an IP address of the second VME port from the controlling bridge. The controlling bridge allocates a second IP address to the second VME port, and notifies the port extender of the second IP address and the first IP address; acquires the second MAC address of the second VME port to send receive a management packet to from the second VME port through three-layer communication.

21 Claims, 5 Drawing Sheets

(51) Int. Cl.
  *H04L 12/741* (2013.01)
  *H04L 29/12* (2006.01)
  *H04L 12/931* (2013.01)

(52) U.S. Cl.
  CPC ........ *H04L 61/103* (2013.01); *H04L 61/2007* (2013.01); *H04L 61/6022* (2013.01)

(56) References Cited

U.S. PATENT DOCUMENTS

| | | |
|---|---|---|
| 2003/0154297 A1 | 8/2003 | Suzuki et al. |
| 2005/0286503 A1 | 12/2005 | Oda et al. |
| 2007/0076607 A1 | 4/2007 | Volt et al. |
| 2007/0133558 A1 | 6/2007 | Wu |
| 2007/0133576 A1 | 6/2007 | Tsuge et al. |
| 2008/0028077 A1 | 1/2008 | Kamata et al. |
| 2009/0034525 A1 | 2/2009 | Wu |
| 2010/0309894 A1 | 12/2010 | Csaszar et al. |
| 2011/0040892 A1 | 2/2011 | Amemiya et al. |
| 2013/0010614 A1 | 1/2013 | Lin et al. |
| 2013/0250961 A1 | 9/2013 | Wu et al. |
| 2014/0044129 A1* | 2/2014 | Mentze ............... H04L 49/354 370/390 |
| 2014/0169377 A1 | 6/2014 | Shuai |
| 2015/0339249 A1* | 11/2015 | Dharmadhikari ... G06F 13/4221 710/316 |
| 2016/0124884 A1 | 5/2016 | Agarwal et al. |
| 2016/0142474 A1 | 5/2016 | Itsumi et al. |
| 2016/0205019 A1 | 7/2016 | Sundaram et al. |
| 2017/0085488 A1 | 3/2017 | Bhattacharya et al. |
| 2017/0093628 A1 | 3/2017 | Lin et al. |

FOREIGN PATENT DOCUMENTS

| | | |
|---|---|---|
| CN | 101115014 A | 1/2008 |
| CN | 101257420 A | 9/2008 |
| CN | 102316028 A | 1/2012 |
| CN | 102377671 A | 3/2012 |
| CN | 104092595 A | 10/2014 |
| CN | 104125191 A | 10/2014 |
| CN | 104144157 A | 11/2014 |
| CN | 104639440 A | 5/2015 |
| CN | 104702438 A | 6/2015 |
| CN | 105099898 A | 11/2015 |
| CN | 105162732 A | 12/2015 |
| CN | 105337819 A | 2/2016 |
| CN | 105765889 A | 7/2016 |
| CN | 105827496 A | 8/2016 |
| CN | 105897467 A | 8/2016 |
| CN | 106254256 A | 12/2016 |
| CN | 106254281 A | 12/2016 |
| CN | 106453155 A | 2/2017 |
| CN | 106533946 A | 3/2017 |
| CN | 106559292 A | 4/2017 |
| CN | 106685818 A | 5/2017 |
| CN | 107547338 A | 1/2018 |
| CN | 108259633 A | 7/2018 |
| JP | 2005217661 A | 8/2005 |
| JP | 2014519249 A | 8/2014 |
| JP | 2017503405 A | 1/2017 |
| WO | 2011137782 A1 | 11/2011 |
| WO | 2016072972 A1 | 5/2016 |

OTHER PUBLICATIONS

"Standard for Local and Metropolitan Area Networks—Virtual Bridged Local Area Networks—Bridge Port Extension," IEEE Std 802.1BR-2012, Jul. 16, 2012, 135 pages.

ISA State Intellectual Property Office of the People's Republic of China, Written Opinion of the International Searching Authority Issued in Application No. PCT/CN2018/088622, dated Aug. 7, 2018, WIPO, 5 pages.

ISA State Intellectual Property Office of the People's Republic of China, Written Opinion of the International Searching Authority Issued in Application No. PCT/CN2018/089224, dated Aug. 14, 2018, WIPO, 5 pages.

European Patent Office, Extended European Search Report Issued in Application No. 18809668.9, dated Feb. 13, 2020, Germany, 8 pages.

European Patent Office, Extended European Search Report Issued in Application No. 18809298.5, dated Apr. 6, 2020, Germany, 7 pages.

State Intellectual Property Office of the People's Republic of China, Office Action and Search Report Issued in Application No. 201710209171.9, dated Apr. 23, 2020, 13 pages. (Submitted with Machine Translation).

Shujun, H. et al., "Discussion on China Mobile's Evolution of Fixed-Line Network Architecture Based on SDN and NFV," China Mobile Research Institute, Feb. 23, 2017, 14 pages.

ISA State Intellectual Property Office of the People's Republic of China, International Search Report Issued in Application No. PCT/CN2018/088622, dated Aug. 7, 2018, WIPO, 4 pages.

ISA State Intellectual Property Office of the People's Republic of China, International Search Report Issued in Application No. PCT/CN2018/089224, dated Aug. 14, 2018, WIPO, 4 pages.

State Intellectual Property Office of the People's Republic of China, Office Action and Search Report Issued in Application No. 201710400903.2, dated Sep. 20, 2019, 15 pages. (Submitted with Partial Translation).

State Intellectual Property Office of the People's Republic of China, Office Action and Search Report Issued in Application No. 201710399886.5, dated Oct. 28, 2019, 10 pages. (Submitted with Partial Translation).

State Intellectual Property Office of the People's Republic of China, Office Action and Search Report Issued in Application No. 201710397622.6, dated Oct. 29, 2019, 11 pages. (Submitted with Partial Translation).

State Intellectual Property Office of the People's Republic of China, Office Action and Search Report Issued in Application No. 201710400903.2, dated May 9, 2020, 17 pages. (Submitted with Machine Translation).

State Intellectual Property Office of the People's Republic of China, Office Action and Search Report Issued in Application No. 201710400903.2, dated Sep. 7, 2020, 8 pages. (Submitted with Machine Translation).

Japanese Patent Office, Office Action Issued in Application No. 2019-566293, dated Nov. 17, 2020, 10 pages. (Submitted with Machine Translation).

Japanese Patent Office, Office Action Issued in Application No. 2019-566294, dated Jan. 5, 2021, 7 pages. (Submitted with Machine Translation).

European Patent Office, Office Action Issued in Application No. 18809298.5, dated Mar. 3, 2021, Germany, 3 pages.

Japanese Patent Office Action, Decision of Refusal Issued in Application No. 2019-566293, Jul. 6, 2021, 6 pages (Submitted with Machine Translation).

* cited by examiner

IMPLEMENTING THREE-LAYER COMMUNICATION

CROSS-REFERENCE TO RELATED APPLICATIONS

The present application is a U.S. National Phase of International Patent Application Serial No. PCT/CN2018/088622 entitled "IMPLEMENTING THREE-LAYER COMMUNICATION," filed on May 28, 2018. International Patent Application Serial No. PCT/CN2018/088622 claims priority to Chinese Patent Application No. 201710397622.6 filed on May 31, 2017, The entire contents of each of the above-cited applications are hereby incorporated by reference in their entirety for all purposes.

BACKGROUND

In 802.1BR standard protocol of The Institute of Electrical and Electronics Engineers (IEEE), Bridge Port Extension is prescribed. The port extension technology is a virtualization technology for a network device, and its core idea is that: at least one Port Extender (PE) is connected to a Controlling Bridge (CB), and through configurations, each of the PEs can be virtualized and function as a remote service board of the CB so that the PEs can be managed collectedly by the CB.

Based on the 802.1BR standard protocol, related content for management of the PEs by the CB is provided insufficiently and non-versatilely. To obtain management packets involving the CB and the PEs in an extended bridge system, many private extension protocol packets are required. In addition, three-layer communication between the CB and the PEs inside the extended bridge system may depend on external network and server, thereby increasing networking cost.

DETAILED DESCRIPTION OF THE EMBODIMENTS

Figure 1:
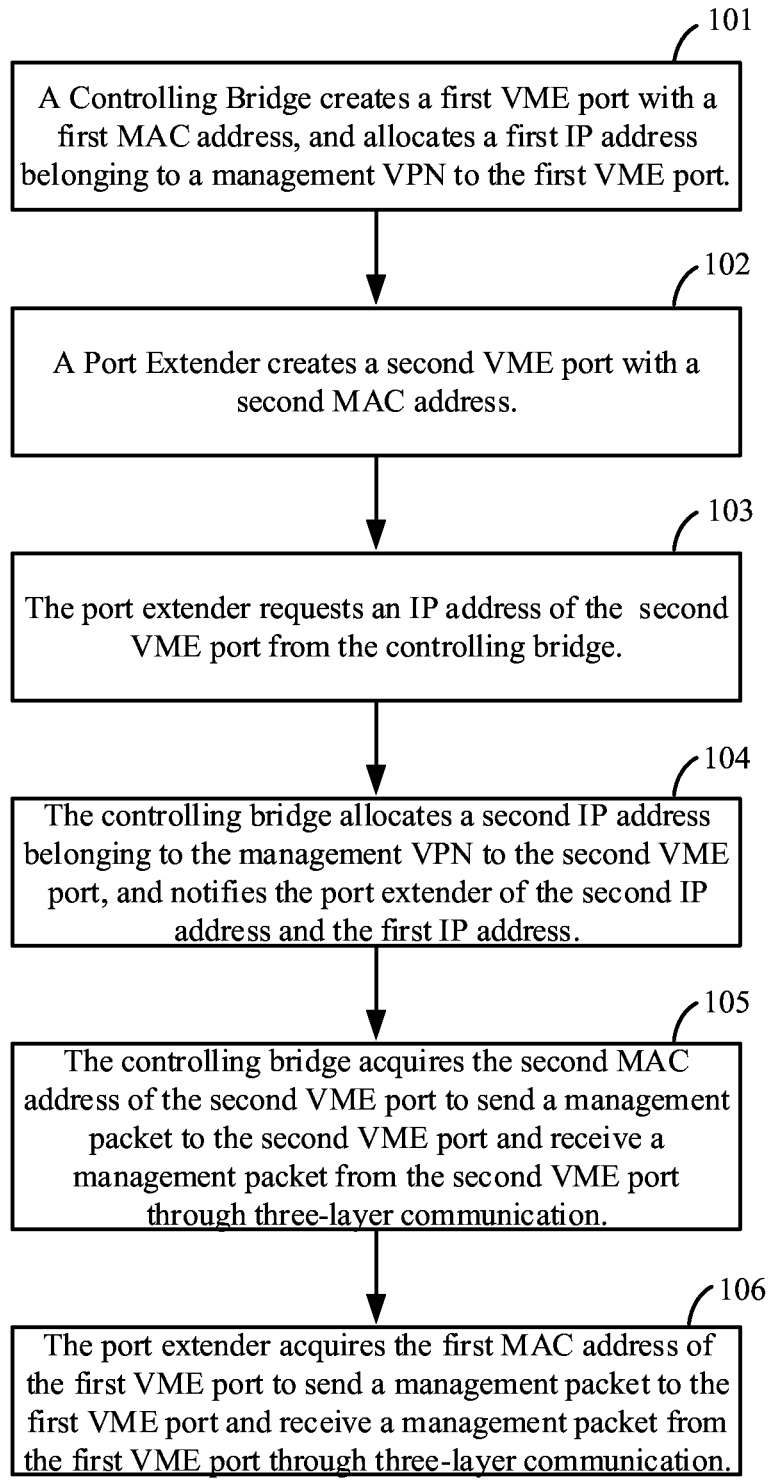
FIG. 1 is a flowchart illustrating a method of implementing three-layer communication according to an example of the present disclosure.

Illustrative examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are merely examples of an apparatus and a method consistent with some aspects of the present disclosure described in detail in the appended claims.

The terminology used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

In a 802.1BR-based virtualization system, a CB device may be connected to at least one PE device, wherein the CB device may be connected to a PE device through a cascade port, and a PE device may be connected to the CB device through an upstream port. In the virtualization system, the CB device is the only device that has a network switching function and performs management of the PE devices.

Based on the 802.1BR standard protocol, related content for management of the PEs by the CB is provided insufficiently and non-versatilely. To obtain management packets involving the CB and the PEs in an extended bridge system, many private extension protocol packets are required. In addition, existing three-layer communication between the CB and the PE inside the extended bridge system depends on an external network and a server, thereby increasing networking cost. To this end, a method, a system, and an apparatus for implementing three-layer communication of a management packet are provided based on an example of the present disclosure. As shown in FIG. 1, the method of implementing three-layer communication of a management packet provided according to an example of the present disclosure may include the following processes.

At process 101: a Controlling Bridge (CB) may create a first Virtual Management Ethernet (VME) port with a first Media Access Control (MAC) address, and allocate a first Internet Protocol (IP) address belonging to a management Virtual Private Network (VPN) to the first VME port.

At process 102: a Port Extender (PE) may create a second VME port with a second MAC address.

At process 103: the port extender may request an IP address of the second VME port from the controlling bridge.

At process 104: the controlling bridge may allocate a second IP address belonging to the management VPN to the second VME port, and notify the port extender of the second IP address and the first IP address.

At process 105: the controlling bridge may acquire the second MAC address of the second VME port to send a management packet to the second VME port and receive a management packet from the second VME port through three-layer communication.

At process 106: the port extender may acquire the first MAC address of the first VME port to send a management packet to the first VME port and receive a management packet from the first VME port through three-layer communication.

The method shown in FIG. 1 may be applied to an extended bridge system. The controlling bridge and the port extender may acquire from each other the IP address and the hardware address (i.e., the MAC address) of their respective VME port, thereby enabling three-layer communication between the CB and the PE inside the 802.1BR system. In such way, the three-layer communication of management packets between the CB and the PE can be implemented. The three-layer communication of management packets between the CB and the PE may not require a private extension protocol packet or depend on external network and server.

In an example of the present disclosure, the term "management packet" refers to a protocol packet other than a data packet, and may have various types such as an ARP protocol packet or a routing protocol packet.

Figure 2A:
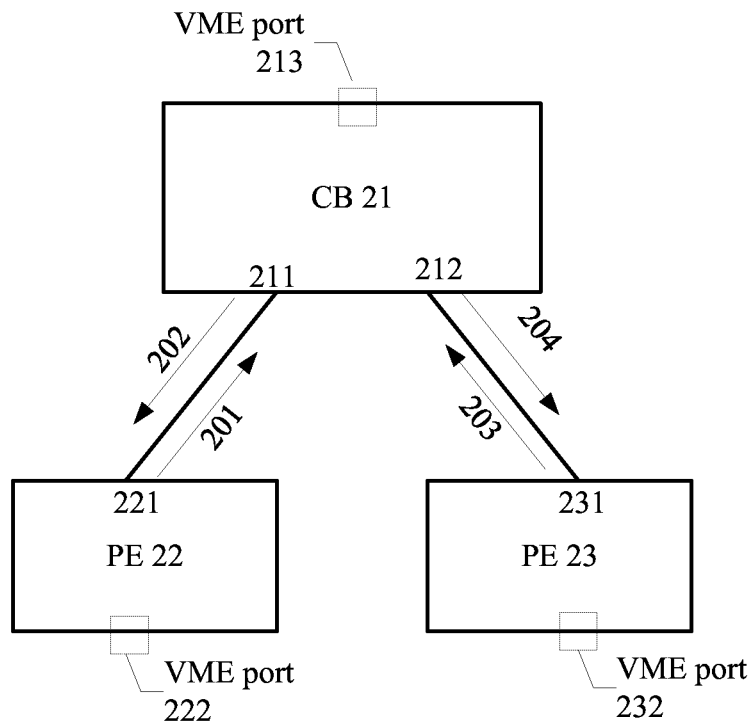
FIG. 2A is a schematic network diagram illustrating requesting an IP address of a VME port on a PE from a CB by the PE in an extended bridge system according to an example of the present disclosure.

In an example of the extended bridge system shown in FIG. 2A, cascade ports 211 and 212 of a CB 21 may be connected to an upstream port 221 of a PE 22 and an upstream port 231 of a PE 23, respectively.

Each of the CB 21, PE 22, and PE 23 may create a VPN as a PE management network (i.e., a management VPN) on its own device. The CB 21 may create a VME port 213 with an Media Access Control (MAC) address MAC 213. The PE 22 may create a VME port 222 with an MAC address MAC 222. The PE 23 may create a VME port 232 with an MAC address MAC 232.

The CB 21 may allocate an IP address IP 213 belonging to the management VPN to the VME port 213. The PE 22 may send an address request message 201 through the upstream port 221 to request an IP address of the VME port 222 from the CB 21. The CB 21 may receive the address request message 201 through the cascade port 211, and then allocate an IP address IP 222 belonging to the management VPN to the VME port 222 of the PE 22. The CB 21 may send an address response message 202 through the cascade port 211 to notify the PE 22 of the IP address IP 213 of the VME port 213 and the IP address IP 222 allocated to the VME port 222. The PE 22 may receive the address response message 202, store the IP address IP 213 of the VME port 213, and configure the allocated IP address IP 222 on the VME port 222.

The PE 23 may send an address request message 203 through the upstream port 231 to request an IP address of the VME port 232 from the CB 21. The CB 21 may receive the address request message 203 through the cascade port 212 and allocate the IP address IP 232 to the VME port 232 of the PE 23. The CB 21 may send an address response message 204 through the cascade port 212 to notify the PE 23 of the IP address IP 213 of the VME port 213 and the IP address IP 232 allocated to the VME port 232. The PE 23 may receive the address response message 204, store the IP address IP 213 of the VME port 213, and configure the allocated IP address IP 232 on the VME port 232.

In an example, the IP address allocated to each VME port by the CB 21 may be an IP address beyond a network segment of 127.0.0.0.0, avoiding a conflict between management packets and service packets. For example, the address request message and the address response message may be implemented by a private extension message.

Figure 2B:
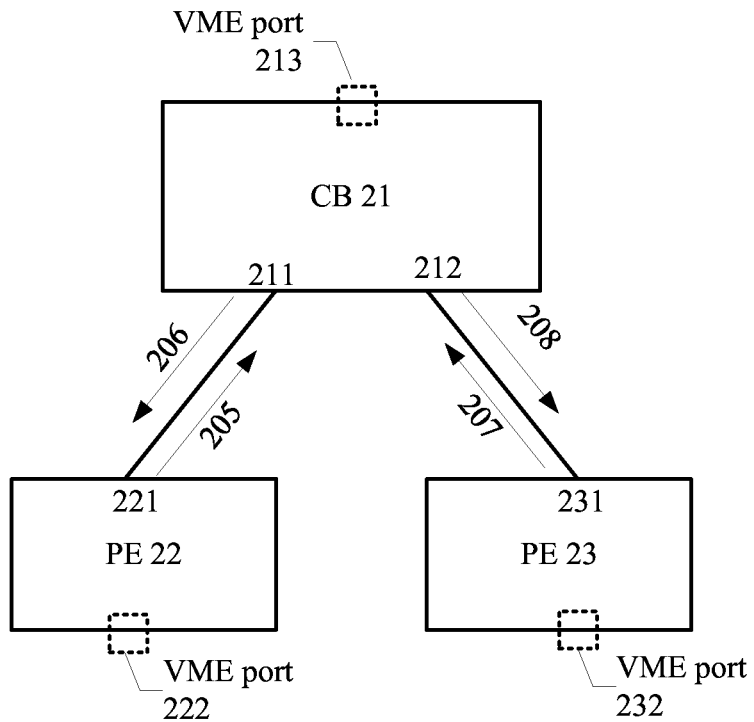
FIG. 2B is a schematic network diagram illustrating requesting an E-Channel Identifier (ECID) of a VME port on a PE from a CB by the PE in an extended bridge system according to an example of the present disclosure.

As shown in FIG. 2B, the PE 22 may send a port create request message 205 through the upstream port 221 to request an E-channel identifier (ECID) of the VME port 222 from the CB 21. The CB 21 may receive the port create request message 205 through the cascade port 211, and allocate an ECID 222 to the VME port 222 of the PE 22. The CB 21 may send a port create response message 206 through the cascade port 211 to notify the PE 22 of the ECID 222 allocated to the VME port 222. The PE 22 may receive the port create response message 206 and bind the VME port 222 with the ECID 222.

The PE 23 may send a port create request message 207 through the upstream port 231 to request an ECID of the VME port 232 from the CB 21. The CB 21 may receive the port create request message 207 through the cascade port 212 and allocate an ECID 232 to the VME port 232 of the PE 23. The CB 21 may send a port create response message 208 through the cascade port 212 to notify the PE 23 of the ECID 232 allocated to the VME port 232. The PE 23 may receive the port create response message 208 and bind the VME port 232 with the ECID 232.

The CB 21 may allocate ECIDs to the VME ports of the PE 22 and the PE 23, respectively and may manage these virtual ports as ordinary extended ports. In this way, the processing flow of management packets between the CB and the PE may be simplified.

The CB 21 may further record a correspondence between the IP address of each VME port, the ECID of the VME port, and the cascade port on the CB 21 which is connected to the PE device located with the VME port. For example, the CB 21 may record a correspondence among the IP 222, ECID 222, and the cascade port 211 and may also record a correspondence among the IP 232, the ECID 232, and the cascade port 212.

Figure 3:
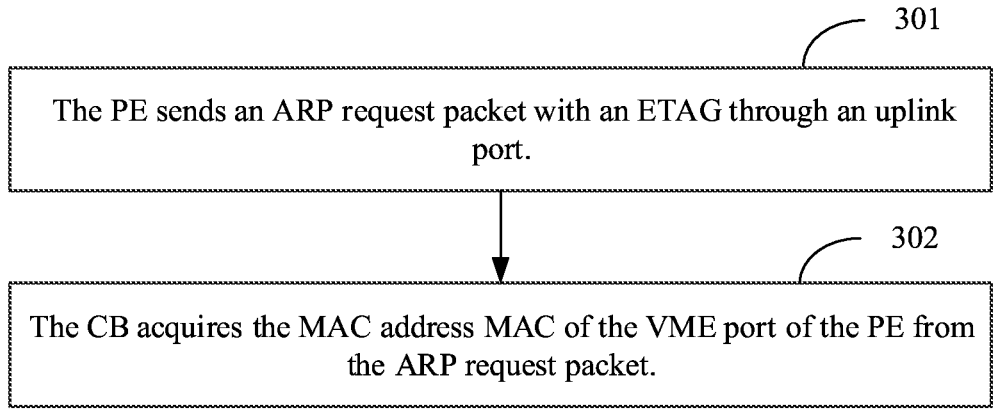
FIG. 3 is a flowchart illustrating acquiring an MAC address of a VME port on a PE by a CB according to an example of the present disclosure.

As shown in FIG. 3, a process in which the CB 21 acquires the MAC address of the VME port 222 of the PE 22 may include the following processes.

At process 301: The PE 22 may send an ARP request packet with an ETAG (E-tag) through an upstream port 221.

A target IP address in the ARP request packet sent by the PE 22 may be the IP address IP 213 of the VME port 213, and a sender IP address and a sender MAC address may be the IP 222 and the MAC 222 of the VME port 222 respectively.

The PE 22 may add an ETAG with the ECID 222 to the ARP request packet to indicate that an ingress port is the VME port 222.

At block 302: The CB 21 may acquire the MAC address MAC 222 of the VME port 222 from the ARP request packet.

The CB 21 may receive the ARP request packet with the ETAG, identify the ECID in the ETAG as the ECID 222 of the VME port 222, remove the ETAG, and acquire the MAC 222 of the VME port 222 according to the sender MAC address. The CB 21 may then send a management packet to the PE 22 through three-layer communication based on the IP address allocated to the VME port 222 and the acquired MAC address of the VME port 222. The CB 21 may record that the IP 222 corresponds to the MAC 222 and an egress port VME 213 in a local ARP entry. In this way, the CB 21 may set a source IP address and a destination IP address of a management packet sent through the VME port 213 as the IP 213 and the IP 222, respectively, encapsulate the packet with the MAC 213 and the MAC 222 as a source MAC address and a destination MAC address, add an ETAG based on the ECID corresponding to the IP 222, and send the management packet with the ETAG through the cascade port 211 corresponding to the IP 222. The PE 22 may receive through the upstream port 221 the management packet, which is sent by the CB 21 through the VME port 213. The PE 22 may identify that the ETAG of the management packet carries the ECID 222, remove the ETAG, identify the destination MAC address as the MAC address of the VME port 222, remove the source MAC address and the destination MAC address from the management packet being received through the upstream port 221, and then send the management packet to a protocol stack for processing.

Figure 4:
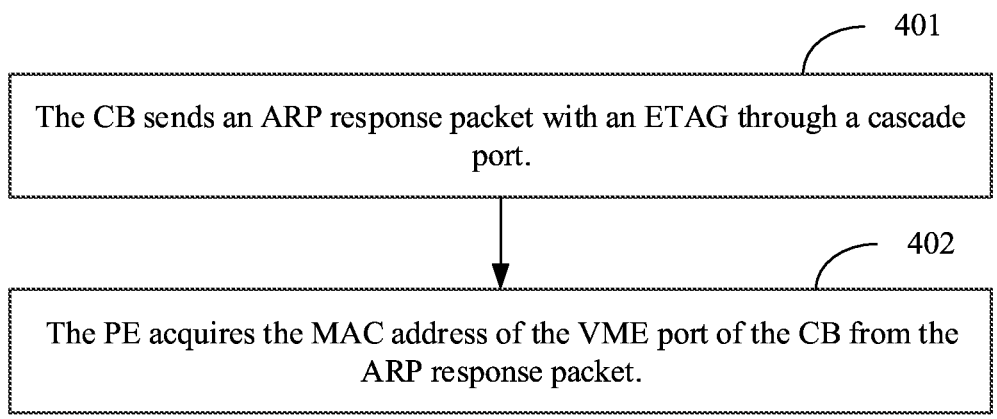
FIG. 4 is a flowchart illustrating acquiring an MAC address of a VME port on a CB by a PE according to an example of the present disclosure.

As shown in FIG. 4, a procedure in which the PE 22 acquires the MAC address of the VME port 213 of the CB 21 may include the following processes.

At process 401: The CB 21 may send an ARP response packet with an ETAG through a cascade port.

A target IP address and a target MAC address in the ARP response packet sent by the CB 21 may be IP 222 and MAC 222 of the VME port 222, respectively, and a sender IP address and a sender MAC address may be the IP 213 and the MAC 213 of the VME port 213.

At process 402: The PE 22 may acquire the MAC address MAC 213 of the VME port 213 from the ARP response packet.

The PE 22 may receive the ARP response packet with the ETAG, and identify the ECID in the ETAG as the ECID 222 of the VME port 222, remove the ETAG, and acquire the MAC address MAC 213 of the VME port 213 based on the sender MAC address.

Similarly, after acquiring the IP address and the MAC address of the VME port 213, the PE 22 may send a management packet to the CB 21 through three-layer communication. The PE 22 may record that the IP 213 corresponds to the MAC 213 and an egress port VME 222 in a local ARP entry. In this way, the PE 22 may set the source IP address and the destination IP address of the management packet sent through the VME port 222 as the IP 222 and the IP 213, respectively, encapsulate the packet with the MAC 222 and the MAC 213 as the source MAC address and the destination MAC address, add an ETAG based on the ECID of the VME port 222, and then send the management packet with the ETAG through the upstream port 221. The CB 21 may receive the management packet with the ETAG through the cascade port 212, identify that the ETAG of the management packet carries the ECID 222, remove the ETAG, identify the destination MAC address as the MAC address of the VME port 213, remove the source MAC address and the destination MAC address from the management packet being received through the cascade port 212, and send the management packet to a protocol stack for processing.

CB 21 may acquire the MAC address of the VME port 232 of the PE 23 in a same manner A target IP address in an ARP request packet sent by the PE 23 may be the IP 213 of the VME port 213, and a sender IP address and a sender MAC address may be the IP 232 and the MAC 232 of the VME port 232, respectively. The PE 23 may add an ETAG with the ECID 232 to the ARP request packet to indicate that the ingress port is the VME port 232. The CB 21 may receive the ARP request packet with the ETAG, identify the ECID in the ETAG as the ECID 232 of the VME port 232, remove the ETAG, and acquire the MAC 232 of the VME port 232 based on the sender MAC address.

The PE 23 may acquire the MAC address of the VME port 213 of the CB 21 in a same manner The CB 21 may send an ARP response packet with an ETAG through a cascade port 212. A target IP address and a target MAC address in the ARP response packet sent by the CB 21 may be IP 232 and MAC 232, respectively, and a sender IP address and a sender MAC address may be the IP 213 and the MAC 213 of the VME port 213, respectively. The PE 23 may receive the ARP response packet with the ETAG, identify the ECID in the ETAG as the ECID 232 of the VME port 232, remove the ETAG, and acquire the MAC address MAC 213 of the VME port 213 based on the sender MAC address.

The manner in which the management packets are sent and received between the VME port 213 of the CB 21 and the VME port 232 of the PE 23 through three-layer communication is the same as the above manner in which the management packets are sent and received between the VME port 213 of the CB 21 and the VME port 222 of the PE 22 through three-layer communication and therefore will not be repeated here.

In an extended bridge system, a three-layer virtual management channel may be established between a CB and each PE. The CB may manage the PE through the virtual management channel. Moreover, since the virtual management channel is implemented based on an IP layer, the management of the PE may be implemented using an existing three-layer management protocol, for example, using one or more of protocols such as a Simple Network Management Protocol (SNMP), a Network Configuration (NETCONF) protocol, a Representational State Transfer (REST) Application Programming Interface (API) protocol, a Telnet protocol, a File Transfer Protocol (FTP), and a Network Time Protocol (NTP). A physical cascade link between the CB and the PE may be multiplexed for the three-layer virtual management channel between the CB and each PE, thereby saving additional networking cost.

In a process of establishing the above virtual management channel, the VME port on the CB and the VME ports on all the PEs may be divided into a management VPN. For example, the CB and each PE may create a VPN instance corresponding to the management VPN on their devices, respectively, and the CB may then bind the VME port on the CB with the VPN instance, so that the VME port on the CB and the VME ports on all the PEs can be divided into the management VPN. In this way, the three-layer management packets may be separated from normal service packets to ensure the security of the management packets. On the other hand, the IP address required to establish the virtual management channel may be limited to the management VPN, thereby saving IP address resources and avoiding occupying the service IP address.

Corresponding to the examples for the above method of three-layer communication of a management packet, the present disclosure further provides a system for implementing three-layer communication of a management packet, an apparatus for implementing three-layer communication of a management packet applied to a controlling bridge, and an apparatus for implementing three-layer communication of a management packet applied to a port extender.

Figure 5:
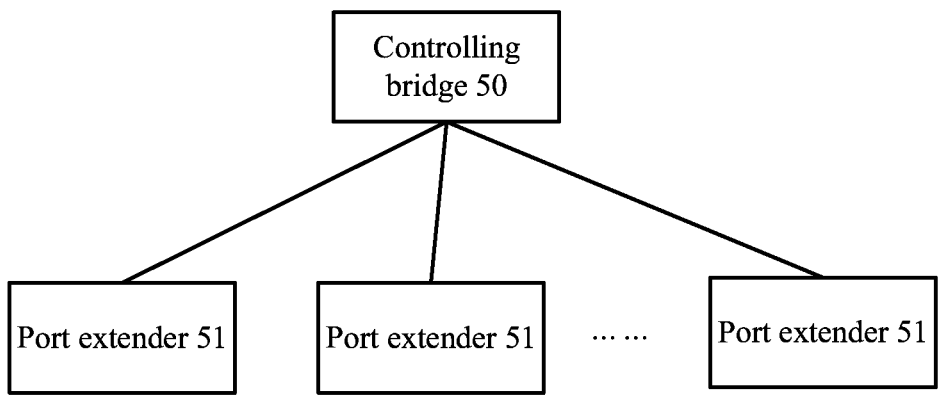
FIG. 5 is a schematic diagram illustrating a structure of a system for implementing three-layer communication of a management packet according to an example of the present disclosure.

As shown in FIG. 5, the system for implementing three-layer communication according to an example of the present disclosure may include a controlling bridge 50 and a port extender 51, where a cascade port of the controlling bridge 50 is connected with an upstream port of each of the port extenders 51.

The controlling bridge 50 may create a first VME port with a first MAC address, and allocate a first IP address belonging to a management virtual private network to the first VME port.

The port extender 51 may create a second VME port with a second MAC address, and request an IP address of the second VME port from the controlling bridge.

The controlling bridge 50 may allocate a second IP address belonging to the management virtual private network to the second VME port, and notify the port extender of the second IP address and the first IP address.

The controlling bridge 50 may acquire a second MAC address of the second VME port to send a management packet to the second VME port and receive a management packet from the second VME port through three-layer communication.

The port extender 51 may acquire the first MAC address of the first VME port to send a management packet to the first VME port and receive a management packet from the first VME port through three-layer communication.

The port extender 51 may request a port identifier of the second VME port from the controlling bridge 50.

The controlling bridge 50 may allocate a port identifier to the second VME port, and notify the port extender of the allocated port identifier.

The port extender 51 may send an ARP request packet with a tag to the controlling bridge 50, where the ARP request packet is used to request an MAC address of the first VME port, and an ingress port identifier of the tag of the ARP request packet is a port identifier of the second VME port.

The controlling bridge 50 may acquire an MAC address of the second VME port based on the ARP request packet with the tag.

The controlling bridge 50 may send an ARP response packet with a tag to the port extender 51, where the ARP response packet is used to notify the MAC address of the first VME port, and an egress port identifier of the tag of the ARP response packet is the port identifier of the second VME port.

The port extender 51 may acquire the MAC address of the first VME port based on the ARP response packet with the tag.

Figure 6:
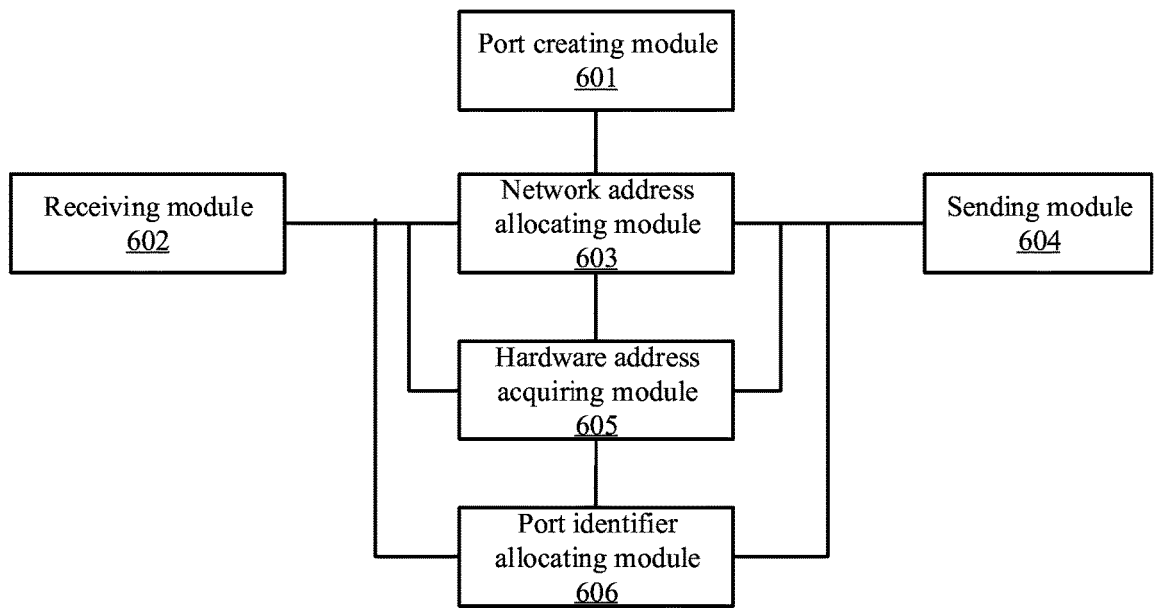
FIG. 6 is a schematic diagram illustrating a structure of an apparatus for implementing three-layer communication of a management packet applied to a controlling bridge according to an example of the present disclosure.

As shown in FIG. 6, the apparatus for implementing three-layer communication applied to the controlling bridge according to an example of the present disclosure may include the following modules.

A port creating module 601 is configured to create the first VME port with the first MAC address.

A receiving module 602 is configured to receive an address request message from the port extender, where the address request message is used to request the controlling bridge to allocate an IP address to the second VME port of the port extender;

A network address allocating module 603 is configured to allocate a first IP address belonging to the management virtual private network to the first VME port and allocate a second IP address belonging to the management virtual private network to the second VME port.

A sending module 604 is configured to send an address response message for notifying the second IP address and the first IP address to the port extender.

A hardware address acquiring module 605 is configured to acquire the second MAC address of the second VME port to send a management packet to the second VME port and receive a management packet from the second VME port through three-layer communication.

As shown in FIG. 6, the apparatus for implementing three-layer communication of a management packet applied to the controlling bridge according to an example of the present disclosure may further include a port identifier allocating module 606.

The receiving module 602 is configured to receive an identifier request message from the port extender, where the identifier request message is used to request the controlling bridge to allocate a port identifier to the second VME port.

The port identifier allocating module 606 is configured to allocate a port identifier to the second VME port after the receiving module 602 receives the identifier request message.

The sending module 604 is configured to send an identifier response message for notifying the port identifier allocated by the port identifier allocating module 606 to the port extender.

The receiving module 602 is configured to receive an ARP request packet with a tag from the port extender, where the ARP request packet is used to request the MAC address of the first VME port, and the ingress port identifier of the tag of the ARP request packet is the port identifier of the second VME port.

The hardware address acquiring module 605 is configured to acquire the MAC address of the second VME port based on the ARP request packet with the tag.

The sending module 604 is configured to send an ARP response packet with a tag to the port extender, where the ARP response packet is used to notify the MAC address of the first VME port, and the egress port identifier of the tag of the ARP response packet is the port identifier of the second VME port.

Figure 7:
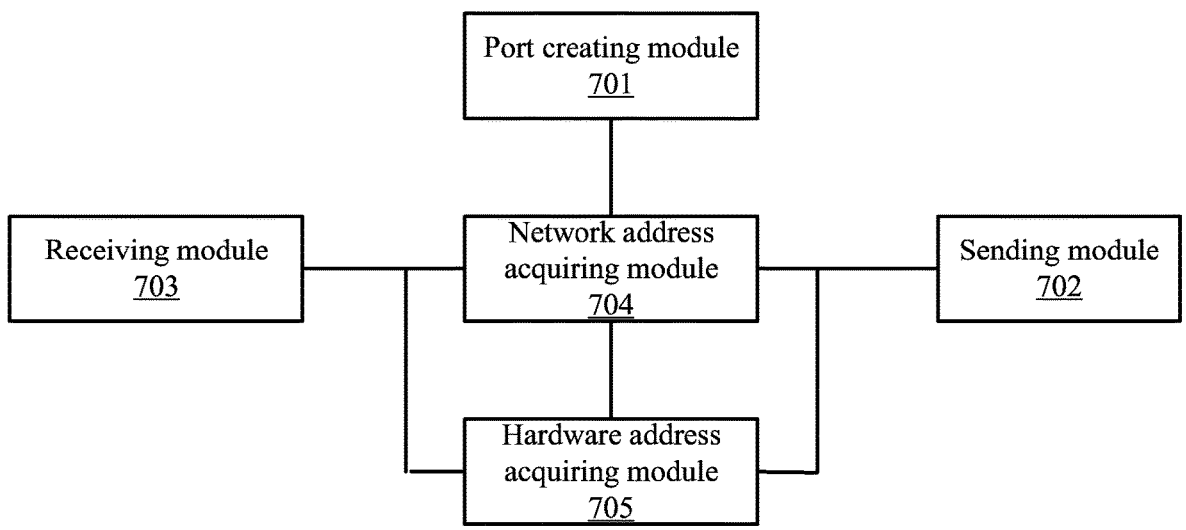
FIG. 7 is a schematic diagram illustrating a structure of an apparatus for implementing three-layer communication of a management packet applied to a port extender according to an example of the present disclosure.

As shown in FIG. 7, the apparatus for implementing three-layer communication of a management packet applied to the port extender according to an example of the present disclosure may include the following modules.

A port creating module 701 is configured to create a second VME port with a second MAC address.

A sending module 702 is configured to send an address request message to the controlling bridge, where the address request message is used to request the controlling bridge to allocate an IP address to the second VME port.

A receiving module 703 is configured to receive an address response message from the controlling bridge, where the address response message is used to notify the first IP address allocated to the first VME port and the second IP address allocated to the second VME port.

A network address acquiring module 704 is configured to acquire the first IP address and the second IP address from the address response message received by the receiving module 703.

The hardware address acquiring module 705 is configured to acquire the first MAC address of the first VME port to send a management packet to the first VME port and receive a management packet from the first VME port through three-layer communication.

The sending module 702 is configured to send an identifier request message to the controlling bridge, where the identifier request message is used to request the controlling bridge to allocate a port identifier to the second VME port.

The receiving module 703 is configured to receive an identifier response message from the controlling bridge, where the identifier response message is used to notify the port identifier allocated to the second VME port.

The sending module 702 is configured to send an ARP request packet with a tag to the controlling bridge, where the ARP request packet is used to request the MAC address of the first VME port, and the ingress port identifier of the tag of the ARP request packet is the port identifier of the second VME port.

The receiving unit 703 is configured to receive an ARP response packet with a tag from the controlling bridge, where the ARP response packet is used to notify the MAC address of the first VME port, and the egress port identifier of the tag of the ARP response packet is the port identifier of the second VME port.

The hardware address acquiring module 705 is configured to acquire the MAC address of the first VME port based on the ARP response packet with the tag.

Figure 8:
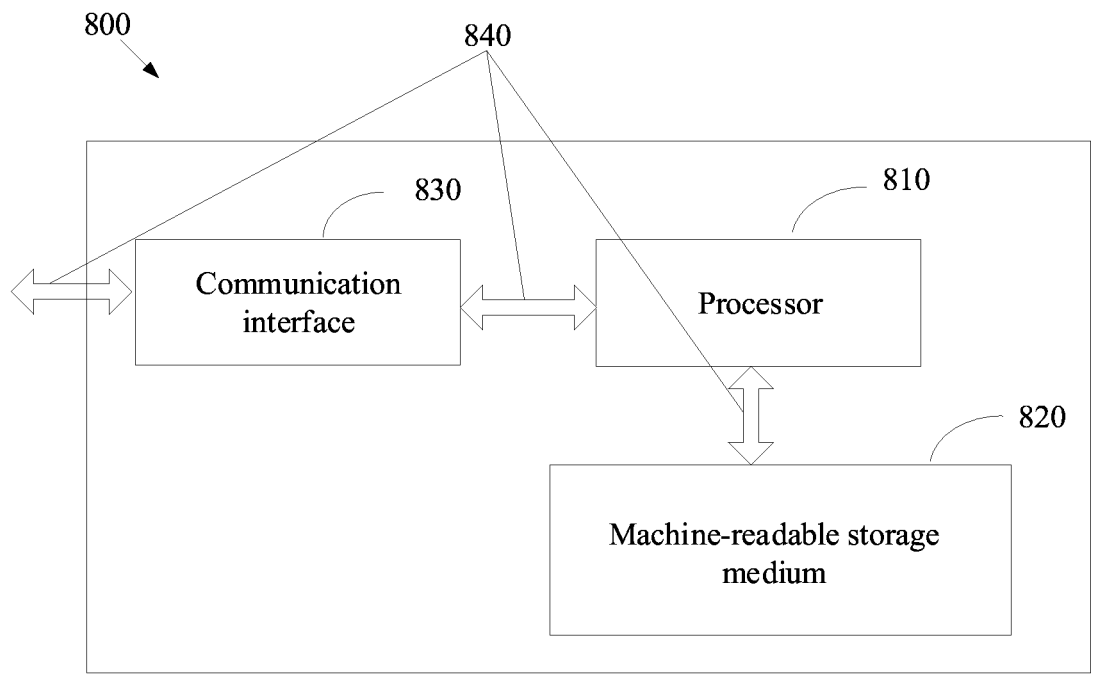
FIG. 8 is a schematic diagram illustrating a structure of a controlling bridge according to an example of the present disclosure.

FIG. 8 is a schematic diagram illustrating a structure of a controlling bridge according to an example of the present disclosure. As shown in FIG. 8, the controlling bridge 800 may include a processor 810, a machine-readable storage medium 820 storing machine-executable instructions, a communication interface 830, and an engaging mechanism 840 through which the processor 810, the machine-readable storage medium 820, and the communication interface 830 are engaged. The communication interface 830 here is not limited and may include a cascade port, a physical port, etc. The machine-readable storage medium 820 may be any electronic, magnetic, optical, or other physical storage devices, and may be volatile or non-volatile, such as a Radom Access Memory (RAM), a flash memory, a storage drive (e.g., a hard disk drive), a solid state hard disk, and any type of storage disks.

The processor 810 may implement all the functions of the port creating module 601, the receiving module 602, the network address allocating module 603, the sending module 604, the hardware address acquiring module 605, and the port identifier allocating module 606 described above by reading and executing the machine-executable instructions.

The structure of the controlling bridge shown in FIG. 8 is merely illustrative rather than limited. According to actual requirements, the controlling bridge may further include other functional components not shown. For example, the controlling bridge may further include a hardware forwarding chip. The functions of the receiving module 602 and the sending module 604 described above may be implemented by the hardware forwarding chip by means of the control of the processor 810. Of course, this is merely an example. The controlling bridge may also have other similar implementations.

Figure 9:
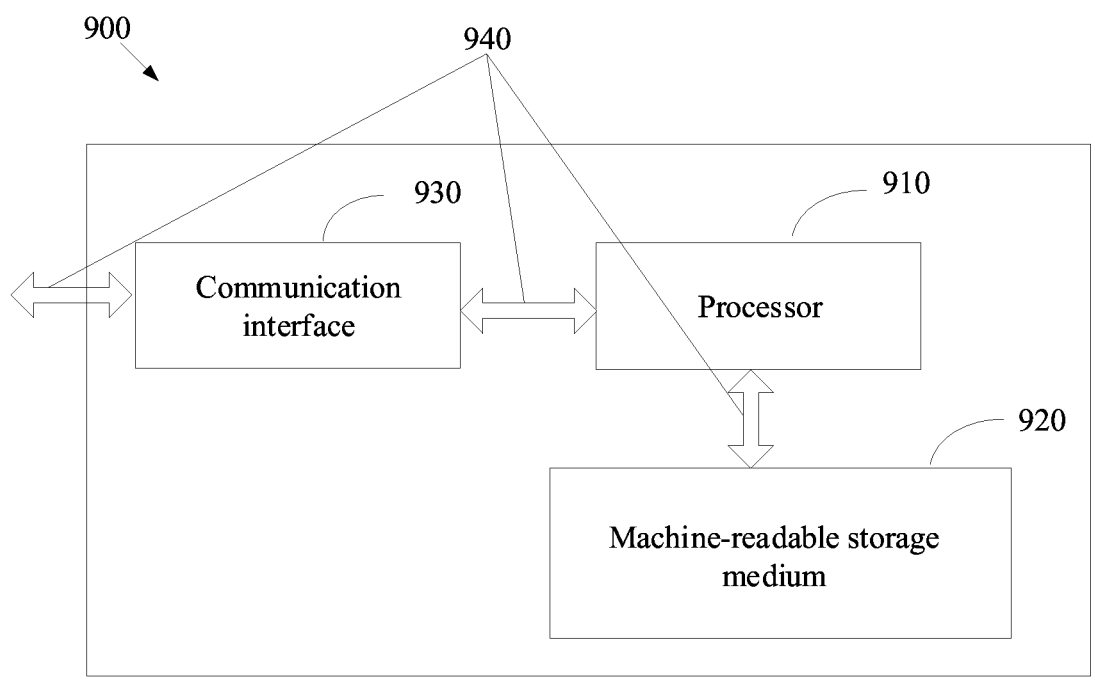
FIG. 9 is a schematic diagram illustrating a structure of a port extender according to an example of the present disclosure.

FIG. 9 is a schematic diagram illustrating a structure of a port extender according to an example of the present disclosure. As shown in FIG. 9, the port extender 900 may include a processor 910, a machine-readable storage medium 920 storing machine-executable instructions, a communication interface 930, and an engaging mechanism 940 through which the processor 910, the machine-readable storage medium 920, and the communication interface 930 are engaged. The communication interface 930 here is not limited. The machine-readable storage medium 920 may be any electronic, magnetic, optical, or other physical storage devices, and may be volatile or non-volatile, such as a Radom Access Memory (RAM), a flash memory, a storage drive (e.g., a hard disk drive), a solid state hard disk, and any type of storage disks.

The processor 910 may implement all the functions of the port creating module 701, the sending module 702, the receiving module 703, the network address acquiring module 704, and the hardware address acquiring module 705 described above by reading and executing the machine-executable instructions.

The structure of the port extender shown in FIG. 9 is merely illustrative rather than limited. According to actual requirements, the controlling bridge may further include other functional components not shown.

The implementation process of the functions and effects of different units in the above apparatus can be referred to the implementation process of the corresponding blocks in the above method, which will not be described here.

Since the apparatus examples substantially correspond to the method examples, a reference may be made to part of the descriptions of the method examples for the related part. The apparatus examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed description of a method and an apparatus provided according to the examples of the present disclosure. Specific examples are used herein to set forth the principles and the implementing methods of the present disclosure, and the descriptions of the above examples are only meant to help understanding of the method and the core idea of the present disclosure. Meanwhile, those of ordinary skill in the art may make alterations to the specific examples and the scope of application in accordance with the idea of the present disclosure. In conclusion, the contents of the present specification shall not be interpreted as limiting to the present disclosure.

The invention claimed is:

1. A method of implementing three-layer communication, applied to a system comprising a controlling bridge and a port extender, wherein the method comprising:
creating, by the controlling bridge, a first Virtual Management Ethernet (VME) port with a first Media Access Control (MAC) address, and allocating a first Internet Protocol (IP) address belonging to a management virtual private network to the first VME port;
creating, by the port extender, a second VME port with a second MAC address;

requesting, by the port extender, an IP address of the second VME port from the controlling bridge;

allocating, by the controlling bridge, a second IP address belonging to the management virtual private network to the second VME port, and notifying the port extender of the second IP address and the first IP address;

acquiring, by the controlling bridge, the second MAC address of the second VME port to send a management packet to the second VME port and receive a management packet from the second VME port through three-layer communication; and acquiring, by the port extender, the first MAC address of the first VME port to send a management packet to the first VME port and receive a management packet from the first VME port through three-layer communication.

2. The method according to claim 1, wherein prior to the controlling bridge acquires the second MAC address of the second VME port, requesting, by the port extender, a port identifier of the second VME port from the controlling bridge; and allocating, by the controlling bridge, a port identifier to the second VME port, and notifying the port extender of the allocated port identifier.

3. The method according to claim 2, further comprising:

sending, by the port extender, an Address Resolution Protocol (ARP) request packet with a tag to the controlling bridge, wherein the ARP request packet is used to request the MAC address of the first VME port, and an ingress port identifier of the tag of the ARP request packet is the port identifier of the second VME port; and acquiring, by the controlling bridge, the MAC address of the second VME port based on the ARP request packet with the tag.

4. The method according to claim 3, further comprising:

sending, by the controlling bridge, an ARP response packet with a tag to the port extender, wherein the ARP response packet is used to notify the MAC address of the first VME port, and an egress port identifier of the tag of the ARP response packet is the port identifier of the second VME port; and acquiring, by the port extender, the MAC address of the first VME port based on the ARP response packet with the tag.

5. The method according to claim 1, further comprising:

receiving, by the controlling bridge, a management packet with a tag, identifying that the tag of the management packet carries a port identifier of the second VME port, and removing the tag from the management packet;

identifying, by the controlling bridge, a destination MAC address of the management packet as the second MAC address of the second VME port, removing a source MAC address and the destination MAC address from the management packet, and sending the management packet to a protocol stack for processing.

6. The method according to claim 1, further comprising:

receiving, by the port extender, a management packet with a tag, identifying that the tag of the management packet carries a port identifier of the first VME port, and removing the tag from the management packet;

identifying, by the port extender, a destination MAC address of the management packet as the first MAC address of the first VME port, removing a source MAC address and the destination MAC address from the management packet, and sending the management packet to a protocol stack for processing.

7. A system for implementing three-layer communication, wherein the system comprises a controlling bridge and a port extender, and a cascade port of the controlling bridge is connected with an upstream port of the port extender;

the controlling bridge creates a first Virtual Management Ethernet (VME) port with a first Media Access Control (MAC) address, and allocates a first Internet Protocol (IP) address belonging to a management virtual private network to the first VME port;

the port extender creates a second VME port with a second MAC address, and requests an IP address of the second VME port from the controlling bridge;

the controlling bridge allocates a second IP address belonging to the management virtual private network to the second VME port, and notifies the port extender of the second IP address and the first IP address;

the controlling bridge acquires the second MAC address of the second VME port to send a management packet to the second VME port and receive a management packet from the second VME port through three-layer communication; and the port extender acquires the first MAC address of the first VME port to send a management packet to the first VME port and receive a management packet from the first VME port through three-layer communication.

8. The system according to claim 7, wherein the port extender requests a port identifier of the second VME port from the controlling bridge; and the controlling bridge allocates a port identifier to the second VME port, and notifies the port extender of the allocated port identifier.

9. The system according to claim 8, wherein the port extender sends an Address Resolution Protocol (ARP) request packet with a tag to the controlling bridge, wherein the ARP request packet is used to request the MAC address of the first VME port, and an ingress port identifier of the tag of the ARP request packet is the port identifier of the second VME port; and the controlling bridge acquires the MAC address of the second VME port based on the ARP request packet with the tag.

10. The system according to claim 9, wherein the controlling bridge sends an ARP response packet with a tag to the port extender, wherein the ARP response packet is used to notify the MAC address of the first VME port, and an egress port identifier of the tag of the ARP response packet is the port identifier of the second VME port; and the port extender acquires the MAC address of the first VME port based on the ARP response packet with the tag.

11. The system according to claim 7, wherein, the controlling bridge receives a management packet with a tag through the cascade port, identifies that the tag of the management packet carries a port identifier of the second VME port, and removes the tag from the management packet;

the controlling bridge identifies a destination MAC address of the management packet as the second MAC address of the second VME port, removes a source MAC address and the destination MAC address from the management packet, and sends the management packet to a protocol stack for processing.

12. The system according to claim 7, wherein, the port extender receives a management packet with a tag through the upstream port, identifies that the tag of the management packet carries a port identifier of the first VME port, and removes the tag from the management packet;

the port extender identifies a destination MAC address of the management packet as the first MAC address of the first VME port, removes a source MAC address and the destination MAC address from the management packet, and sends the management packet to a protocol stack for processing.

13. A port extender comprised in the system according to claim 7, wherein the port extender comprises:

a processor; and a non-transitory machine-readable storage medium storing machine-executable instructions, wherein by executing the machine-executable instructions, the processor is caused to:

create a second Virtual Management Ethernet (VME) port with a second Media Access Control (MAC) address;

send, to a controlling bridge in the system, an address request message used to request the controlling bridge to allocate an Internet Protocol (IP) address to the second VME port;

receive an address response message from the controlling bridge, the address response message being used to notify a first IP address of a first VME port on the controlling bridge and a second IP address allocated to the second VME port;

acquire the first IP address and the second IP address from the received address response message; and acquire a first MAC address of the first VME port to send a management packet to the first VME port and receive a management packet from the first VME port through three-layer communication.

14. The port extender according to claim 13, wherein the processor is further caused by executing the machine-executable instructions to:

send, to the controlling bridge, an identifier request message used to request the controlling bridge to allocate a port identifier to the second VME port; and receive, from the controlling bridge, an identifier response message used to notify the port identifier allocated to the second VME port.

15. The port extender according to claim 14, wherein the processor is further caused by the machine-executable instructions to:

send an Address Resolution Protocol (ARP) request packet with a tag to the controlling bridge, wherein the ARP request packet is used to request the MAC address of the first VME port, and an ingress port identifier of the tag of the ARP request packet is the port identifier of the second VME port;

receive an ARP response packet with a tag from the controlling bridge, wherein the ARP response packet is used to notify the MAC address of the first VME port, and an egress port identifier of the tag of the ARP response packet is the port identifier of the second VME port; and acquire the MAC address of the first VME port based on the ARP response packet with the tag.

16. The port extender according to claim 13, wherein the processor is further caused by the machine-executable instructions to:

receive a management packet with a tag, identify that the tag of the management packet carries a port identifier of the first VME port, and remove the tag from the management packet;

identify a destination MAC address of the management packet as the first MAC address of the first VME port, remove a source MAC address and the destination MAC address from the management packet, and send the management packet to a protocol stack for processing.

17. A controlling bridge, comprising:

a processor; and a non-transitory machine-readable storage medium storing machine-executable instructions, wherein by executing the machine-executable instructions, the processor is caused to:

create a first Virtual Management Ethernet (VME) port with a first Media Access Control (MAC) address, and allocate a first Internet Protocol (IP) address belonging to a management virtual private network to the first VME port;

receive, from a port extender, an address request message used to request the controlling bridge to allocate an IP address to a second VME port of the port extender;

allocate a second IP address belonging to the management virtual private network to the second VME port;

send an address response message for notifying the second IP address and the first IP address to the port extender; and acquire a second MAC address of the second VME port to send a management packet to the second VME port and receive a management packet from the second VME port through three-layer communication.

18. The controlling bridge according to claim 17, wherein before acquiring the second MAC address of the second VME port, the processor is further caused by the machine-executable instructions to:

receive, from the port extender, an identifier request message used to request the controlling bridge to allocate a port identifier to the second VME port;

allocate a port identifier to the second VME port; and send an identifier response message for notifying the allocated port identifier to the port extender.

19. The controlling bridge according to claim 18, wherein the processor is further caused by the machine-executable instructions to:

receive an Address Resolution Protocol (ARP) request packet with a tag from the port extender, wherein the ARP request packet is used to request the MAC address of the first VME port, and an ingress port identifier of the tag of the ARP request packet is the port identifier of the second VME port; and acquire the MAC address of the second VME port based on the ARP request packet with the tag.

20. The controlling bridge according to claim 19, wherein the processor is further caused by the machine-executable instructions to:

send an ARP response packet with a tag to the port extender, wherein the ARP response packet is used to notify the MAC address of the first VME port, and an egress port identifier of the tag of the ARP response packet is the port identifier of the second VME port.

21. The controlling bridge according to claim 17, wherein the processor is further caused by the machine-executable instructions to:

receive a management packet with a tag, identify that the tag of the management packet carry a port identifier of the second VME port, and remove the tag from the management packet;

identify a destination MAC address of the management packet as the second MAC address of the second VME port, remove a source MAC address and the destination MAC address from the management packet, and send the management packet to a protocol stack for processing.

* * * * *